I | US010047496B2

(12) United States Patent
Yamashita et al.

(10) Patent No.: US 10,047,496 B2
(45) Date of Patent: Aug. 14, 2018

(54) BULLDOZER

(71) Applicant: KOMATSU LTD., Tokyo (JP)

(72) Inventors: Tetsunori Yamashita, Hirakata (JP);
Kazuyuki Suzuki, Hirakata (JP);
Souichi Tsumura, Hirakata (JP);
Youhei Takahashi, Hirakata (JP)

(73) Assignee: KOMATSU LTD., Tokyo (JP)

( * ) Notice: Subject to any disclaimer, the term of this patent is extended or adjusted under 35 U.S.C. 154(b) by 99 days.

(21) Appl. No.: 15/117,476

(22) PCT Filed: Feb. 19, 2016

(86) PCT No.: PCT/JP2016/054821
§ 371 (c)(1),
(2) Date: Aug. 9, 2016

(87) PCT Pub. No.: WO2017/064873
PCT Pub. Date: Apr. 20, 2017

(65) Prior Publication Data
US 2017/0260714 A1    Sep. 14, 2017

(51) Int. Cl.
*E02F 3/76* (2006.01)
*E02F 3/627* (2006.01)
(Continued)

(52) U.S. Cl.
CPC ............ *E02F 3/7609* (2013.01); *B60K 11/04* (2013.01); *B60R 19/52* (2013.01); *E02F 3/815* (2013.01);
(Continued)

(58) Field of Classification Search
CPC ....... E02F 3/76; E02F 9/16; E02F 9/08; E02F 3/7609; E02F 3/815; E02F 9/0866;
(Continued)

(56) References Cited

U.S. PATENT DOCUMENTS 1,695,584 A * 12/1928 Gustafson ............... B60R 19/52
293/48
2,128,957 A *  9/1938 Morrison ................ B60R 19/52
165/98
(Continued)

FOREIGN PATENT DOCUMENTS

JP    2007-320517 A    12/2007
JP    2009-507145 A     2/2009
(Continued)

*Primary Examiner* — John Weiss
(74) *Attorney, Agent, or Firm* — Drinker Biddle & Reath LLP (57) ABSTRACT

A first grille member extends from the left side of the vehicular body toward the right side. A second grille member extends from the first grille member further toward the right side. A first pivot shaft is provided at the left side of the vehicular body. The first pivot shaft extends in the top-bottom direction of the vehicular body and pivotably supports the first grille member. A second pivot shaft extends in parallel with the first pivot shaft and couples the second grille member to the first grille member so that the second grille member is pivotable with respect to the first grille member. A fan module is pivotable about a third pivot shaft provided at the left side of the vehicular body and extending in parallel with the first pivot shaft, and at least a part of the fan module is movable to an outside of the vehicular body.

7 Claims, 6 Drawing Sheets

(51) Int. Cl.
  *B60K 11/04* (2006.01)
  *B60R 19/52* (2006.01)
  *E02F 3/815* (2006.01)
  *E02F 9/16* (2006.01)
  *E02F 9/08* (2006.01)
  *E02F 3/84* (2006.01)
  *E02F 9/22* (2006.01)
  *E02F 9/20* (2006.01)

(52) U.S. Cl.
  CPC .............. *E02F 9/0866* (2013.01); *E02F 9/16* (2013.01); *E02F 3/7604* (2013.01); *E02F 3/7618* (2013.01); *E02F 3/844* (2013.01); *E02F 9/2004* (2013.01); *E02F 9/2271* (2013.01)

(58) Field of Classification Search
  CPC ....... B60K 11/04; B60K 11/08; B60K 11/085; B60R 19/52; B60R 2019/525
  USPC ............ 172/811, 799.5; 180/68.1; 296/193.1
  See application file for complete search history.

(56) References Cited

U.S. PATENT DOCUMENTS

| | | | | |
|---|---|---|---|---|
| 3,834,478 A | * | 9/1974 | Alexander | ............ B60K 11/04 165/77 |
| 5,785,139 A | * | 7/1998 | Freedy | ................... B60K 11/04 180/68.1 |
| 6,286,897 B1 | * | 9/2001 | Ruhter | ................... A01B 63/00 180/89.12 |
| 7,753,152 B2 | * | 7/2010 | Nakae | ................... B60K 11/04 165/122 |
| 8,186,751 B2 | * | 5/2012 | Davisdon | ................ B60R 19/52 296/193.1 |
| 8,875,824 B1 | * | 11/2014 | Yamamitsu | ............. B60R 19/52 180/68.1 |
| 8,960,342 B2 | * | 2/2015 | Werner | ................... B60K 11/04 165/41 |
| 2011/0272967 A1 | * | 11/2011 | Davisdon | ................ B60R 19/52 296/193.1 |
| 2014/0224558 A1 | | 8/2014 | Kure | |
| 2015/0017901 A1 | * | 1/2015 | Pfohl | ...................... F01P 5/043 454/141 |

FOREIGN PATENT DOCUMENTS

| | | |
|---|---|---|
| JP | 2009-083803 A | 4/2009 |
| JP | 2013-204295 A | 10/2013 |
| WO | WO-2007/032242 A1 | 3/2007 |

* cited by examiner

BULLDOZER

TECHNICAL FIELD

The present invention relates to a bulldozer.

BACKGROUND ART

A bulldozer is equipped with an engine compartment formed in a front portion of the vehicular body of the bulldozer. In the engine compartment, an engine is disposed and a radiator for cooling the engine and a fan for generating cooling air to be supplied to the radiator are also disposed. To the front face of the engine compartment, a front grille is attached. The cooling air generated by the fan flows through the front grille.

In order to facilitate cleaning of the radiator, a front grille attached to the vehicular body in such a manner that enables the front grille to open and close has been proposed. For example, Japanese Patent Laying-Open No. 2013-204295 (PTD 1) proposes a front grille including a plate disposed at the right side of the vehicular body and a plate disposed at the left side thereof to form a double door openable at a wide angle.

CITATION LIST

Patent Document

PTD 1: Japanese Patent Laying-Open No. 2013-204295

SUMMARY OF INVENTION

Technical Problem

In a bulldozer disclosed in Japanese Patent Laying-Open No. 2013-204295 (PTD 1), a fan and a radiator are arranged in this order from the front side of the vehicular body. Even when the front grille is opened, the radiator which is located behind the fan is difficult to clean from the front side of the vehicular body, and thus the cleaning workability is low.

An object of the present invention is to provide a bulldozer enabling a radiator to be cleaned easily.

Solution to Problem

A bulldozer of the present invention includes a vehicular body, a front grille, a blade, a radiator, and a fan module. The front grille is disposed at a front end of the vehicular body. The blade is disposed frontward of and spaced from the front grille. The radiator is disposed in an engine compartment of the vehicular body. The fan module is disposed in the engine compartment, and a distance between the fan module and the front end is smaller than a distance between the radiator and the front end. The front grille includes a first grille member, a second grille member, a first pivot shaft, and a second pivot shaft. The first grille member extends from one side toward the other side of the vehicular body in a right-left direction of the vehicular body. The second grille member extends from the first grille member further toward the other side. The first pivot shaft is provided at the one side. The first pivot shaft extends in a top-bottom direction of the vehicular body. The first pivot shaft pivotably supports the first grille member. The second pivot shaft extends in parallel with the first pivot shaft. The second pivot shaft couples the second grille member to the first grille member so that the second grille member is pivotable with respect to the first grille member. The fan module is pivotable about a third pivot shaft provided at the one side and extending in parallel with the first pivot shaft, and at least a part of the fan module is movable to an outside of the vehicular body.

Regarding the bulldozer of the present invention, the front grille is configured to be foldable, so that the front grille can be opened widely. Moreover, the fan module can be pivoted to expose the radiator to the outside. Thus, the radiator can be cleaned easily.

In the bulldozer, the first grille member is provided to extend from the one side to a central part of the vehicular body in the right-left direction, and the second grille member is provided to extend from the central part to the other side. Accordingly, the front grille can be configured to be foldable in half.

In the bulldozer, the first grille member is configured to be pivotable about the first pivot shaft to a position where the first grille member does not overlap the radiator as seen in front view. Accordingly, the front grille can be opened widely.

In the bulldozer, the second grille member includes a front surface facing frontward and a rear surface facing rearward in a state where the second grille member is disposed to extend in the right-left direction of the vehicular body. The second grille member includes a distal end located away from the second pivot shaft. The front surface has an inclined surface at the distal end, and the inclined surface approaches the rear surface as a distance from the second pivot shaft increases. Accordingly, the maximum angle by which the fan module is pivotable can be made large and therefore the radiator can be exposed to a large extent.

The bulldozer further includes a cab. An operator operating the bulldozer is aboard the cab. The bulldozer further includes an operator's seat disposed in the cab so that a front edge of the operator's seat is inclined rightward with respect to a front-rear direction of the vehicular body as seen in plan view. Accordingly, from the right side of the vehicular body, the operator can easily access the radiator.

The bulldozer further includes an access device disposed at the other side for the cab and forms a passage for the operator to get on and get off the cab. Accordingly, the operator can easily access the radiator from the other side of the vehicular body.

In the bulldozer, the fan module includes a fan blade. The third pivot shaft overlaps the fan blade as seen in side view, in a state where a rotational center of the fan blade extends in a front-rear direction of the vehicular body. Accordingly, when the fan module is pivoted, the fan module can be prevented from interfering with parts around the fan module.

Advantageous Effects of Invention

The bulldozer of the present invention enables the radiator to be cleaned easily.

DESCRIPTION OF EMBODIMENTS

In the following, embodiments of the present invention will be described based on the drawings.

Initially, a description will be given of a configuration of a bulldozer to which the concept of the present invention is applicable.

Figure 1:
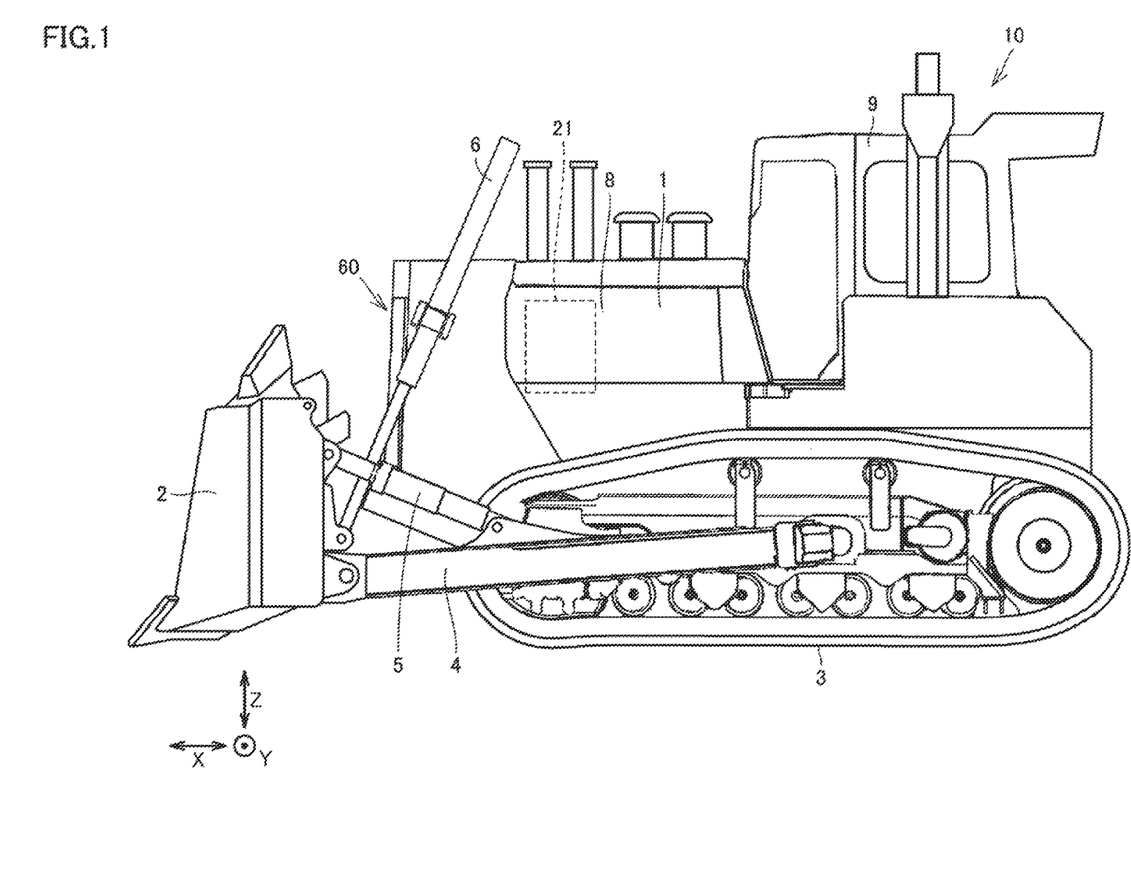
FIG. 1 is a side view schematically showing a configuration of a bulldozer in one embodiment of the present invention.
Figure 2:
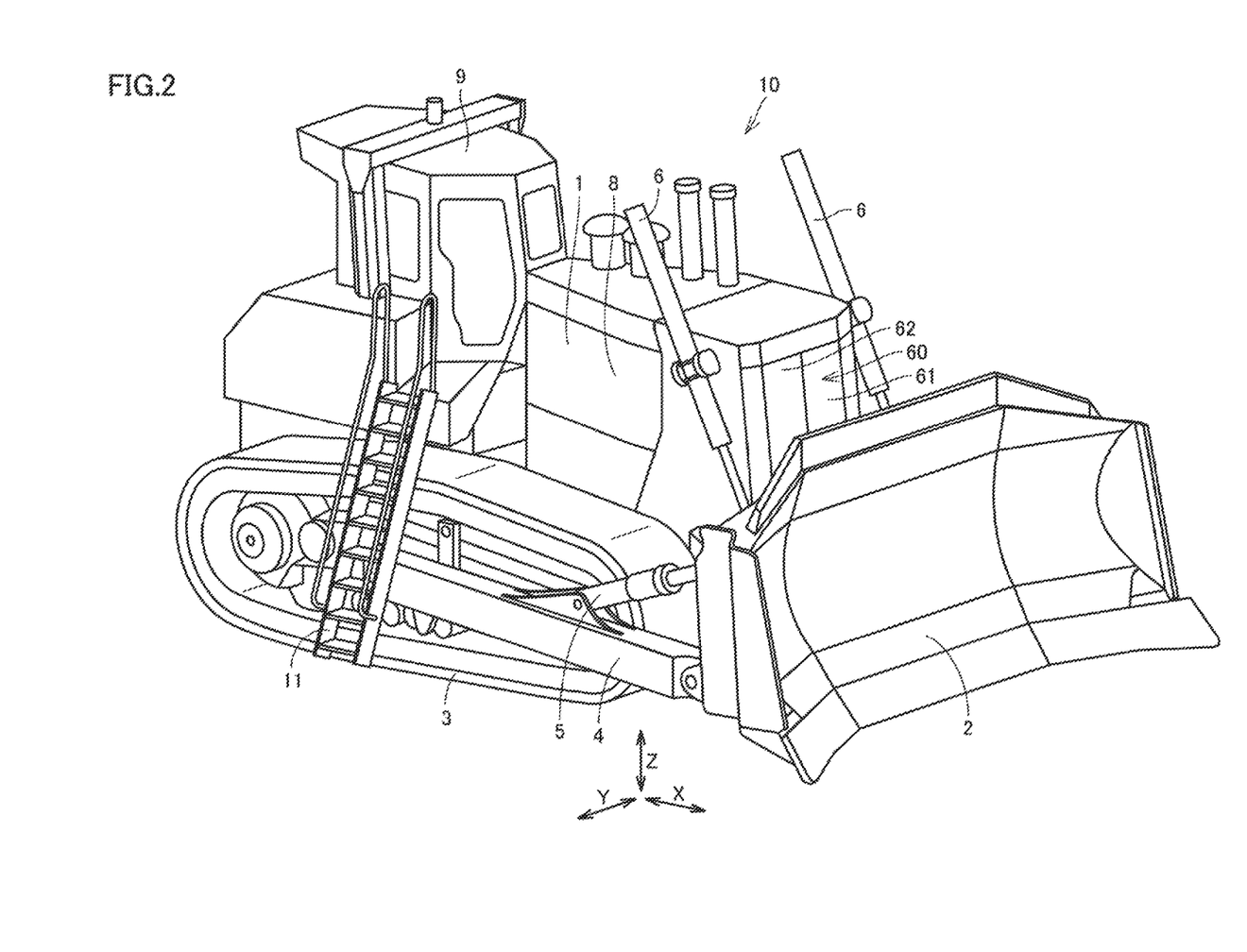
FIG. 2 is a perspective view schematically showing the configuration of the bulldozer in one embodiment of the present invention.

FIG. 1 is a side view schematically showing a configuration of a bulldozer 10 in one embodiment of the present invention. FIG. 2 is a perspective view schematically showing the configuration of bulldozer 10 in one embodiment of the present invention. As shown in FIGS. 1 and 2, bulldozer 10 of the present embodiment mainly includes a vehicular body 1, a blade 2, and a traveling device. The traveling device has a pair of right and left crawler type carriers 3 separated from each other in the vehicular width direction. Vehicular body 1 is disposed between the paired right and left crawler type carriers 3. Blade 2 is disposed at a frontward position of vehicular body 1.

Vehicular body 1 has a cab (operator's cab) 9 and an engine compartment 8. Cab 9 is disposed in an upper rear portion of vehicular body 1. Engine compartment 8 is disposed frontward of cab 9. Engine compartment 8 is disposed between cab 9 and blade 2. In engine compartment 8, an engine 21 is housed. An operator operating bulldozer 10 is aboard cab 9. Cab 9 has, in its inside, an operator's seat for an operator to sit, and is configured to surround the operator's seat.

In the present embodiment, the direction in which bulldozer 10 travels straight forward is referred to as front-rear direction of bulldozer 10. In the front-rear direction of bulldozer 10, the direction in which blade 2 protrudes from vehicular body 1 is referred to as frontward direction. In the front-rear direction of bulldozer 10, the direction opposite to the frontward direction is referred to as rearward direction. The right-left direction of bulldozer 10 is the direction orthogonal to the front-rear direction as seen in plan view. From the viewpoint in the frontward direction, the right side and the left side in the right-left direction are respectively rightward direction and leftward direction. The top-bottom direction of bulldozer 10 is the direction orthogonal to a plane defined by the front-rear direction and the right-left direction. In the top-bottom direction, the ground side is lower side and the sky side is upper side.

The front-rear direction is the front-rear direction with respect to an operator sitting on the operator's seat in cab 9. The right-left direction is the right-left direction with respect to an operator sitting on the operator's seat. The right-left direction is the vehicular width direction of bulldozer 10. The top-bottom direction is the top-bottom direction with respect to an operator sitting on the operator's seat. The direction in which an operator sitting on the operator's seat faces is the frontward direction, and the backward direction with respect to an operator sitting on the operator's seat is the rearward direction. The right side and the left side with respect to an operator sitting on the operator's seat and facing frontward are respectively the rightward direction and the leftward direction. The feet side and the head side of an operator sitting on the operator's seat are respectively the lower side and the upper side.

In the following drawings, the front-rear direction is indicated by an arrow X, the right-left direction is indicated by an arrow Y, and the top-bottom direction is indicated by an arrow Z.

Bulldozer 10 includes blade 2 located frontward as a work implement. Blade 2 is a work implement for performing work such as excavating earth and sand and grading. Blade 2 is supported at each of its right side and left side by a frame 4. Frame 4 is a member in the shape of a quadrangular prism. One end of frame 4 is attached to the back surface of blade 2 by a rotatable support. The other end of frame 4 is supported on a side surface of the traveling device. The right frame 4 and the back surface of blade 2 are coupled together by an arm 7 shown in FIG. 5.

Blade 2 is actuated by a tilt cylinder 5 and a lift cylinder 6. One end of tilt cylinder 5 is supported on the back surface of blade 2. The other end of tilt cylinder 5 is supported on the upper surface of frame 4. Tilt cylinder 5 is extended/contracted by hydraulic pressure to cause the top end of blade 2 to move in the front-rear direction about the support with which frame 4 is attached to blade 2. Accordingly, the tilt angle of blade 2 is changed.

One end of lift cylinder 6 is supported on the back surface of blade 2. An intermediate portion of lift cylinder 6 is supported on a side surface of vehicular body 1. Lift cylinder 6 is extended/contracted by hydraulic pressure to cause blade 2 to move in the top-bottom direction about the other end of frame 4.

Bulldozer 10 may include a ripper device behind vehicular body 1 as another work implement.

A front grille 60 is attached to vehicular body 1. Front grille 60 is disposed at the front end of vehicular body 1. Front grille 60 is disposed to cover an opening formed at the front end of vehicular body 1. Blade 2 is disposed frontward of and spaced from front grille 60.

Front grille 60 has a first grille member 61 and a second grille member 62. First grille member 61 extends from the left side toward the right side of vehicular body 1 in the right-left direction of vehicular body 1. First grille member 61 is provided to extend from the left side in the right-left direction of vehicular body 1 to a central part in the right-left direction of vehicular body 1.

Second grille member 62 extends from first grille member 61 further toward the right side in the right-left direction of vehicular body 1. Second grille member 62 is provided to extend from the central part in the right-left direction of the vehicular body to the right side in the right-left direction of the vehicular body. The left half, in the right-left direction, of the opening formed at the front end of vehicular body 1 is covered with first grille member 61 and the right half, in the right-left direction, of the opening is covered with second grille member 62.

For cab 9, an access device 11 is disposed at the right side in the right-left direction of vehicular body 1. Access device 11 is for example a ladder or a stepladder. Access device 11 constitutes a part of the path connecting the ground to cab 9. Access device 11 forms a passage for an operator to get on cab 9 or get off cab 9.

Figure 3:
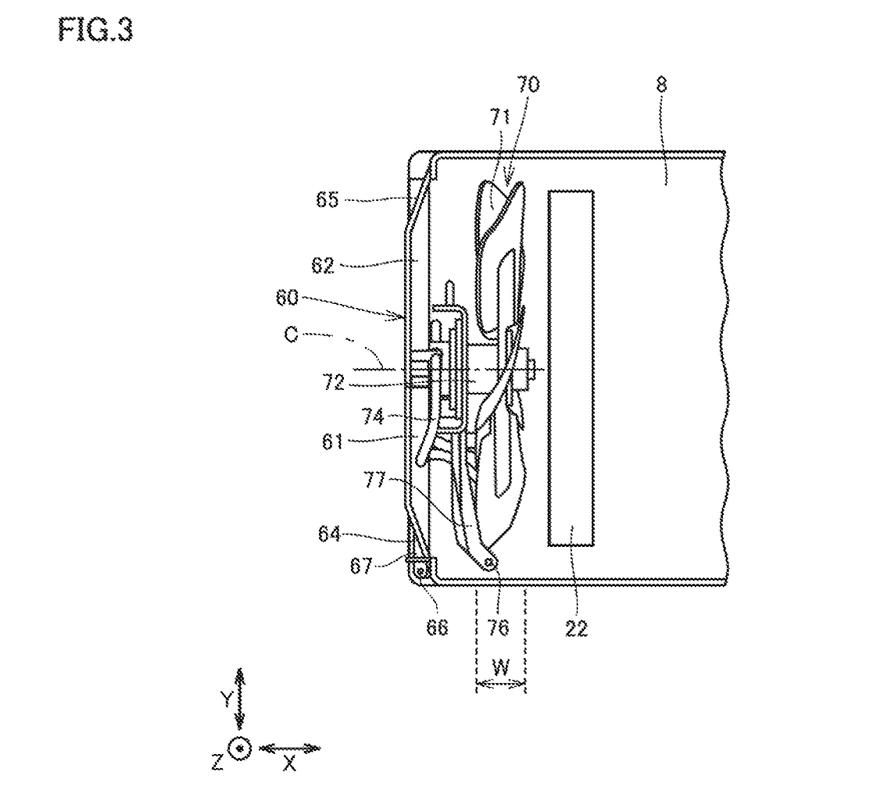
FIG. 3 is a plan view schematically showing a fan module in a state of being housed in a vehicular body.

FIG. 3 is a plan view schematically showing a fan module 70 in a state of being housed in vehicular body 1. In engine compartment 8, a radiator 22 and fan module 70 are housed in addition to engine 21 shown in FIG. 1. Radiator 22 is a device for cooling a coolant circulating between engine 21 (FIG. 1) and radiator 22. Radiator 22 is disposed in engine compartment 8 at a smaller distance from the front end of vehicular body 1 than the distance from the front end to engine 21.

Fan module 70 is a device for generating a flow of air passing through radiator 22. Fan module 70 is disposed in engine compartment 8 at a smaller distance from the front end of vehicular body 1 than the distance from the front end to radiator 22. A fan shroud 73 described later herein is not shown in FIG. 3 for the sake of clarifying the illustration.

As shown in FIG. 3, fan module 70 has a fan blade 71 and a drive device 72. Drive device 72 is a device for generating a driving force for rotating fan blade 71. Fan blade 71 is rotatably supported by drive device 72. The dot-and-dash line shown in FIG. 3 indicates a rotational center C about which fan blade 71 is rotated by the driving force given by drive device 72. In the state shown in FIG. 3 in which fan module 70 is disposed in engine compartment 8, rotational center C extends in the front-rear direction of vehicular body 1, and fan blade 71 extends in the right-left direction of vehicular body 1.

Fan module 70 is a hydraulically-driven fan for example. To drive device 72, a hydraulic pipe 74 is connected.

Fan module 70 is attached to vehicular body 1 so that fan module 70 is pivotable about a pivot shaft 76. Pivot shaft 76 is disposed at the left side of vehicular body 1 in the right-left direction of vehicular body 1. Pivot shaft 76 extends in the top-bottom direction of vehicular body 1. Pivot shaft 76 and drive device 72 are coupled together by a coupling portion 77. Fan blade 71, drive device 72, and coupling portion 77 are provided so that they are pivotable together about pivot shaft 76.

Width W shown in FIG. 3 indicates a range in which fan blade 71 is located in the front-rear direction of vehicular body 1. In the state where fan module 70 is disposed as shown in FIG. 3, pivot shaft 76 is located within the range of width W. When fan module 70 shown in FIG. 3 is seen in the right-left direction, pivot shaft 76 and fan blade 71 overlap each other. In the state shown in FIG. 3 where rotational center C of fan blade 71 extends in the front-rear direction of vehicular body 1, pivot shaft 76 overlaps fan blade 71 as seen in side view.

Figure 4:
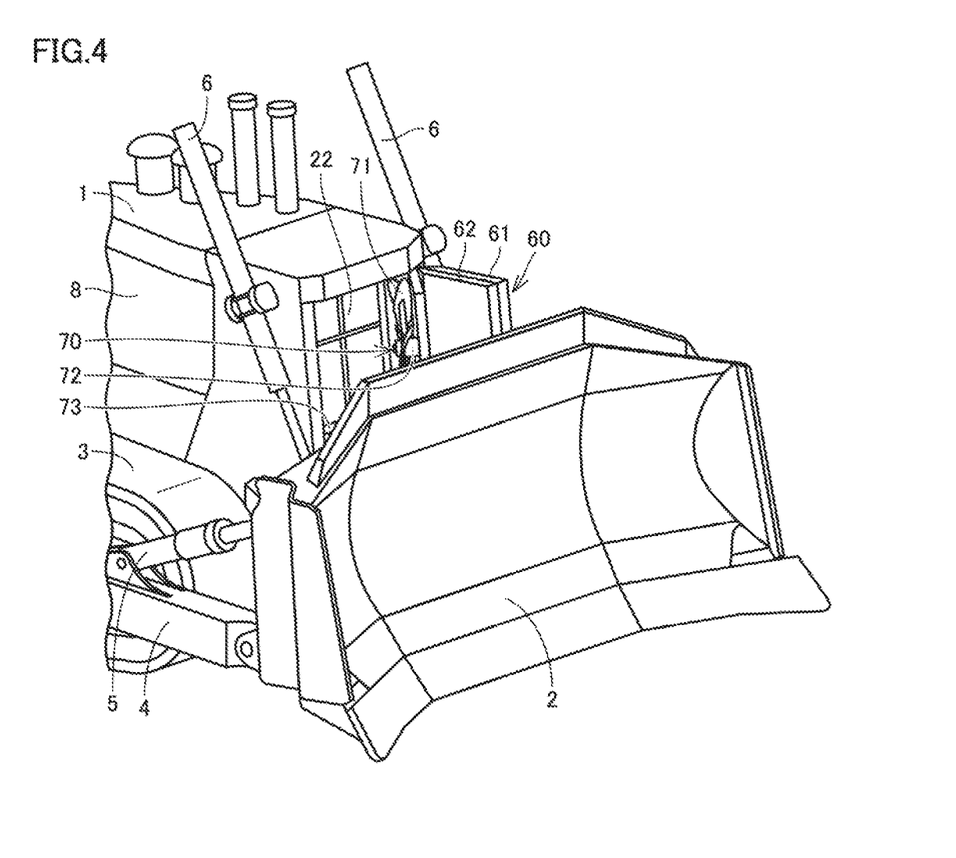
FIG. 4 is a perspective view schematically showing an opened state of a front grille.
Figure 5:
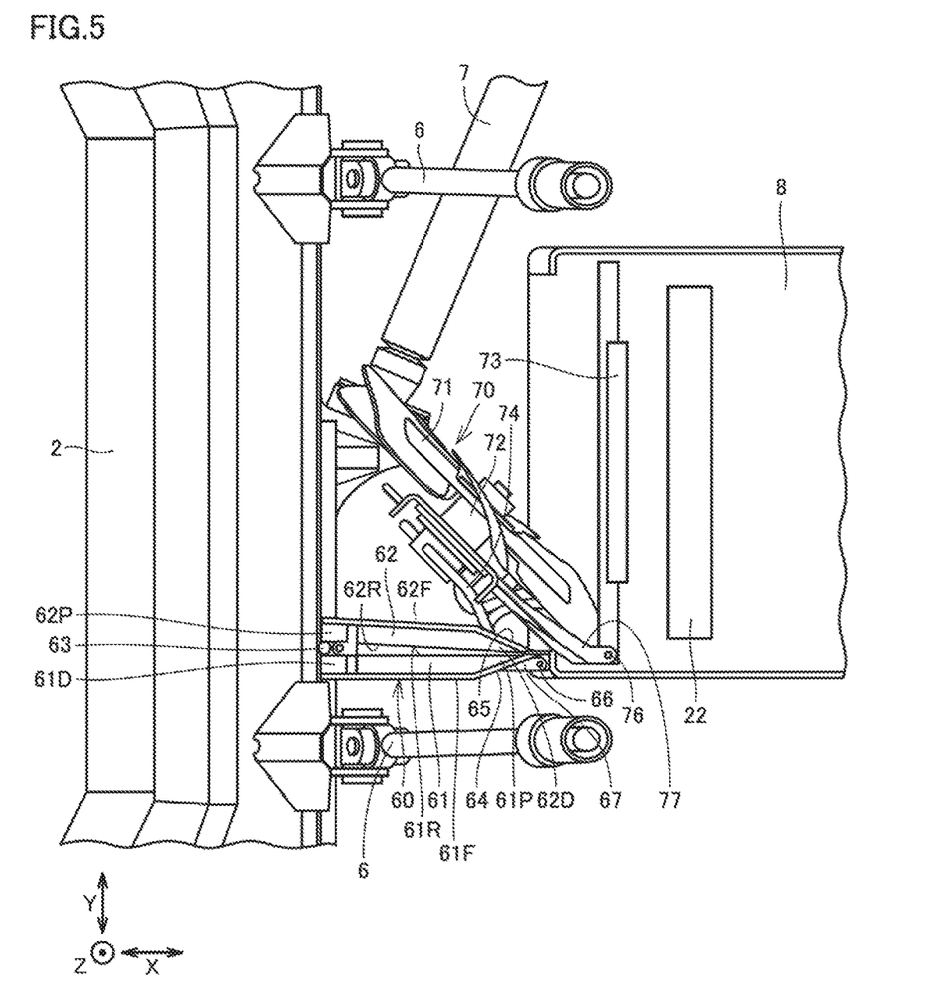
FIG. 5 is a plan view schematically showing the opened state of the front grille.

FIG. 4 is a perspective view schematically showing an opened state of front grille 60. FIG. 5 is a plan view schematically showing the opened state of front grille 60. As shown in FIGS. 4 and 5, first grille member 61 is attached to vehicular body 1 so that first grille member 61 is pivotable about a pivot shaft 66. Second grille member 62 is attached to first grille member 61 so that second grille member 62 is pivotable about a pivot shaft 63.

Pivot shaft 66 is disposed at the left side of vehicular body 1 in the right-left direction of vehicular body 1. Pivot shaft 66 extends in the top-bottom direction of vehicular body 1. Pivot shaft 66 and first grille member 61 are coupled together by a coupling portion 67. Pivot shaft 66 pivotably supports first grille member 61. First grille member 61, second grille member 62, pivot shaft 63, and coupling portion 67 are provided so that they are pivotable together about pivot shaft 66.

First grille member 61 and second grille member 62 are coupled together by a hinge. Pivot shaft 63 forms the shaft of the hinge. Pivot shaft 63 couples second grille member 62 to first grille member 61 so that second grille member 62 is pivotable with respect to first grille member 61. Pivot shaft 63 extends in the top-bottom direction of vehicular body 1. Pivot shaft 63 extends in parallel with pivot shaft 66. Pivot shaft 63 and pivot shaft 66 each serve as a center of pivoting of front grille 60 and extend in parallel with pivot shaft 76 serving as a center of pivoting of fan module 70. In the state where front grille 60 is closed as shown in FIGS. 2 and 3, pivot shaft 63 is located at a central part in the right-left direction of vehicular body 1.

Second grille member 62 can be pivoted about pivot shaft 63 with respect to first grille member 61 to thereby fold front grille 60 in half. First grille member 61 can be pivoted about pivot shaft 66 with respect to vehicular body 1 to thereby dispose the whole of front grille 60 which is in the state of being folded in half, along the left side in the right-left direction of vehicular body 1. First grille member 61 is pivotable from the closed state shown in FIGS. 2 and 3 by a maximum angle of 90° or more about pivot shaft 66. The maximum pivoting angle of first grille member 61 may be defined as 90°.

First grille member 61 may be configured so that first grille member 61 can be fixed (held) at a predetermined pivoting position and can be locked to be non-pivotable about pivot shaft 66. Second grille member 62 may be configured so that second grille member 62 can be fixed (held) at a predetermined pivoting position and can be locked to be non-pivotable about pivot shaft 63.

In the state as shown in FIG. 5 where first grille member 61 is pivoted about pivot shaft 66 to the maximum extent, first grille member 61 is disposed at a position where first grille member 61 does not overlap radiator 22 as seen in the front-rear direction of vehicular body 1. First grille member 61 is configured to be pivotable about pivot shaft 66 to the position where first grille member 61 does not overlap radiator 22 as seen in front view. In the state as shown in FIG. 5, second grille member 62 is disposed at a position where second grille member 62 overlaps radiator 22 as seen in front view.

Fan module 70 is pivotable about pivot shaft 76. Pivot shaft 76 serving as the center about which fan module 70 is pivoted is different from pivot shaft 66 serving as the center about which first grille member 61 is pivoted. In the front-rear direction, pivot shaft 76 is located rearward of pivot shaft 66. Pivot shaft 66 is located at a smaller distance from the front end of vehicular body 1 than the distance from the front end to pivot shaft 76.

Fan module 70 shown in FIGS. 4 and 5 is pivoted about pivot shaft 76 to be moved frontward, from the disposition of fan module 70 shown in FIG. 3. In the plan view shown in FIG. 5, fan module 70 is pivoted counterclockwise about pivot shaft 76, relative to fan module 70 disposed in engine compartment 8 as shown in FIG. 3. A part of fan module 70 is movable to the outside of vehicular body 1. Specifically, as shown in FIG. 5, the whole of drive device 72, the whole of a portion of fan blade 71 extending from drive device 72 away from pivot shaft 76, and a part of a portion of fan blade 71 extending from drive device 72 toward pivot shaft 76 have been moved to the outside of vehicular body 1.

The maximum angle by which fan module 70 is pivoted about pivot shaft 76 is smaller than the maximum angle by which first grille member 61 is pivoted about pivot shaft 66. Fan module 70 may be configured so that fan module 70 can be fixed (held) at a predetermined pivoting position and can be locked to be non-pivotable about pivot shaft 76.

Fan module 70 has fan shroud 73 provided outside and along the outer circumference of fan blade 71. Fan shroud 73 is provided to regulate the flow of air passing through radiator 22. Fan shroud 73 has a substantially annular shape covering the outer circumference of fan blade 71. Fan shroud 73 is disposed to face the leading end of fan blade 71. Fan shroud 73 is fixed to vehicular body 1. In contrast to fan blade 71, fan shroud 73 is configured to be non-rotatable with respect to vehicular body 1.

As shown in FIG. 5, first grille member 61 has a front surface 61F and a rear surface 61R. Second grille member 62 has a front surface 62F and a rear surface 62R. Front surfaces 61F, 62F face frontward and face blade 2 in the state where front grille 60 is closed as shown in FIGS. 2 and 3. Rear surfaces 61R, 62R face rearward and face fan module 70 in the state where front grille 60 is closed as shown in FIGS. 2 and 3. In the state where first grille member 61 extends in the right-left direction of vehicular body 1 as shown in FIGS. 2 and 3, front surface 61F faces frontward and rear surface 61R faces rearward. In the state where second grille member 62 extends in the right-left direction of vehicular body 1 as shown in FIGS. 2 and 3, front surface 62F faces frontward and rear surface 62R faces rearward.

In the state as shown in FIGS. 4 and 5 where second grille member 62 is pivoted about pivot shaft 63 with respect to first grille member 61, rear surface 61R of first grille member 61 and rear surface 62R of second grille member 62 face each other. Front surfaces 61F, 62F form the outer surface of front grille 60 in the state of being folded in half. In the state where front grille 60 is folded in half, front surface 61F of first grille member 61 faces lift cylinder 6. In the state where front grille 60 is folded in half and additionally fan module 70 is pivoted about pivot shaft 76, front surface 62F of second grille member 62 faces fan module 70.

First grille member 61 has a proximal end 61P and a distal end 61D. Proximal end 61P is an end of first grille member 61 which is substantially plate-shaped, and proximal end 61P is relatively closer to pivot shaft 66. Distal end 61D is an end of substantially plate-shaped second grille member 62, and distal end 61D is relatively further from pivot shaft 66. Front surface 61F of first grille member 61 has an inclined surface 64 at proximal end 61P. Inclined surface 64 is inclined so that front surface 61F is closer to rear surface 61R as the distance from pivot shaft 66 decreases.

Second grille member 62 has a proximal end 62P and a distal end 62D. Proximal end 62P is an end of second grille member 62 which is substantially plate-shaped, and proximal end 62P is relatively closer to pivot shaft 63. Distal end 62D is an end of substantially plate-shaped second grille member 62, and distal end 62D is relatively further from pivot shaft 63. Front surface 62F of second grille member 62 has an inclined surface 65 at distal end 62D. Inclined surface 65 is inclined so that front surface 62F is closer to rear surface 62R as the distance from pivot shaft 63 increases.

In the state where front grille 60 is closed to cover the opening at the front end of vehicular body 1, inclined surfaces 64, 65 are formed at respective opposite ends of the front surface of front grille 60, in the right-left direction of vehicular body 1. In the state where front grille 60 is closed, inclined surface 64 is inclined rearward toward the left side, and inclined surface 65 is inclined rearward toward the right side. In the state where front grille 60 is opened and folded in half to expose the opening at the front end of vehicular body 1, inclined surfaces 64, 65 are formed in front surfaces 61F, 62F forming the outer surface of front grille 60, and inclined surfaces 64, 65 are located at respective ends relatively closer to pivot shaft 63.

In the state as shown in FIG. 5 where front grille 60 is opened and folded in half and additionally fan module 70 is pivoted about pivot shaft 76, radiator 22 is exposed toward the front side of vehicular body 1. A worker can use an air blow gun for example to emit compressed air toward exposed radiator 22 and thereby clean radiator 22 easily.

Figure 6:
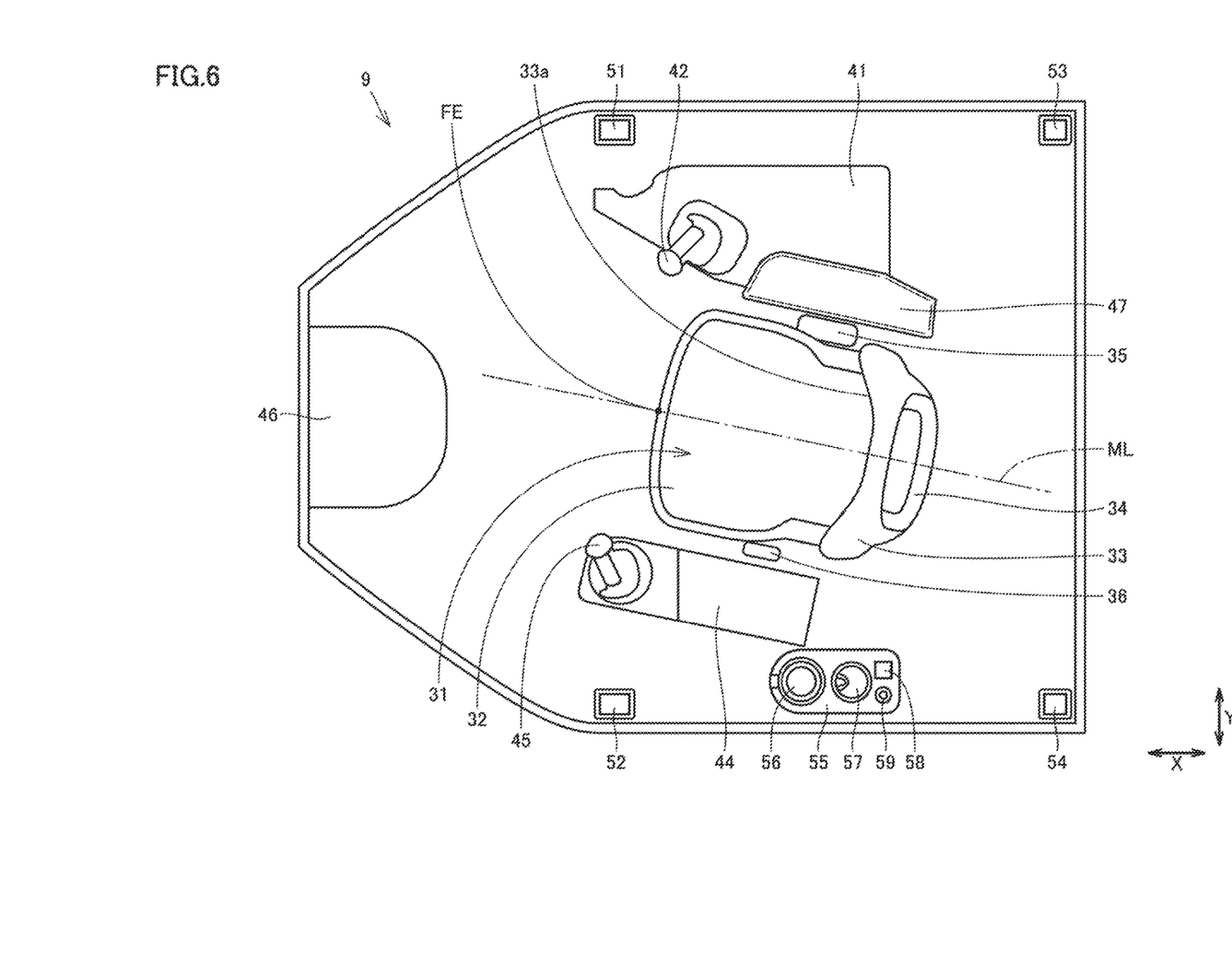
FIG. 6 is a plan view schematically showing a configuration of an inside of a cab.

FIG. 6 is a plan view schematically showing a configuration of an inside of cab 9 shown in FIG. 1. As shown in FIG. 6, an operator's seat 31 is disposed inside cab 9. Cab 9 has a roof portion disposed to cover operator's seat 31 and a plurality of pillars supporting the roof portion. Each pillar extends in the top-bottom direction (Z direction) and is coupled to the floor portion and the roof portion of cab 9.

The plurality of pillars include front pillars 51, 52 and rear pillars 53, 54. Front pillars 51, 52 are disposed frontward in the front-rear direction (X direction) with respect to operator's seat 31. Rear pillars 53, 54 are disposed rearward in the front-rear direction (X direction) with respect to operator's seat 31. Front pillar 51 and rear pillar 53 are disposed rightward in the vehicular width direction (Y direction) with respect to operator's seat 31. Front pillar 52 and rear pillar 54 are disposed leftward in the vehicular width direction (Y direction) with respect to operator's seat 31.

Operator's seat 31 is disposed substantially at the center of cab 9. Operator's seat 31 has a seat portion 32, a back portion 33, and a headrest 34. An operator aboard cab 9 sits on seat portion 32. Back portion 33 is provided for the operator sitting on seat portion 32 to rest the operator's back on the back portion. A side support protruding frontward is provided at each of the right end and the left end of back portion 33 so as to immovably support the sitting operator. To the top end of back portion 33, headrest 34 is attached. Headrest 34 protects the head of the operator from impact.

A front console 46 is disposed frontward of operator's seat 31 in cab 9. To front console 46, a control panel, gauges, switches, and the like are attached.

On the right side of operator's seat 31 in cab 9, a right console 41 is disposed. On right console 41, a lever for controlling the work implement is provided. To right console 41, a blade control lever 42 for controlling blade 2 is attached. Blade control lever 42 is disposed at a front portion of right console 41.

On the right side of operator's seat 31 in cab 9, a right armrest 47 is disposed. Right armrest 47 is disposed laterally with respect to operator's seat 31. In the vehicular width direction (Y direction), right armrest 47 is disposed between operator's seat 31 and right console 41.

On the left side of operator's seat 31 in cab 9, a left console 44 is disposed. On left console 44, a lever for controlling traveling of bulldozer 10 is provided. To left console 44, a travel control lever 45 is attached. Travel control lever 45 is disposed at a front portion of left console 44. A rear portion of left console 44 is provided to serve as a left armrest.

On the right side of operator's seat 31 in cab 9, a belt housing 35 for housing a seat belt is disposed. Belt housing 35 is disposed between operator's seat 31 and right armrest 47. On the left side of operator's seat 31 in cab 9, a latch portion 36 for latching the seat belt is disposed. Latch portion 36 is disposed between operator's seat 31 and left console 44. The seat belt is pulled from belt housing 35 and latching hardware at the leading end of the seat belt is engaged with latch portion 36 to place the seat belt on the waist of an operator sitting on operator's seat 31.

On the left side of operator's seat 31 in cab 9, a side shelf 55 is disposed. Side shelf 55 is disposed laterally with respect to operator's seat 31. On side shelf 55, a cup holder 56, an ashtray 57, a cigarette lighter 58, and an external connection terminal 59 are provided. Cup holder 56, ashtray 57, cigarette lighter 58, and external connection terminal 59 constitute a handled portion to be handled by an operator sitting on operator's seat 31.

The dot-and-dash line in FIG. 6 indicates a median line ML of operator's seat 31. The median line is a virtual line dividing operator's seat 31 into a right half and a left half.

When operator's seat 31 is seen from the front, median line ML passes through the center in the lateral direction of operator's seat 31. When operator's seat 31 is seen from the back, median line ML passes through the center in the lateral direction of operator's seat 31. In the plan view shown in FIG. 6, median line ML passes through the center of operator's seat 31 and extends along the position dividing operator's seat 31 into equal parts.

In the case where operator's seat 31 is bilaterally symmetrical in shape, median line ML is located on the plane of symmetry. However, operator's seat 31 of the present embodiment may not be completely symmetrical. Median line ML may be a line dividing, into equal parts, a bilaterally symmetrical member which forms a part of operator's seat 31. Median line ML may also be a line dividing, into equal parts, a bilaterally symmetrical part of a member which forms a part of operator's seat 31. For example, median line ML may be a line dividing seat portion 32 into equal parts, a line dividing back portion 33 into equal parts, a line dividing a front surface 33a of the back portion into equal parts, or a line dividing headrest 34 into equal parts.

As shown in FIG. 6, median line ML of operator's seat 31 extends to incline with respect to the front-rear direction (X direction) of cab 9, so that median line ML inclines rightward toward the front and inclines leftward toward the back. Operator's seat 31 is fixed in cab 9, so that a front edge FE of operator's seat 31 inclines rightward with respect to the front-rear direction (X direction) of cab 9 as seen in plan view. Front edge FE is a front end portion of operator's seat 31 and this front end portion is located on median line ML as seen in plan view.

Next, functions and effects of the present embodiment will be described.

Bulldozer 10 of the present embodiment includes front grille 60 disposed at the front end of vehicular body 1, and fan module 70 disposed in engine compartment 8, as shown in FIG. 3. Front grille 60 has first grille member 61 and second grille member 62. As shown in FIG. 5, front grille 60 has pivot shaft 66 pivotably supporting first grille member 61, and pivot shaft 63 coupling second grille member 62 to first grille member 61 so that second grille member 62 is pivotable with respect to first grille member 61. Fan module 70 is pivotable about pivot shaft 76, and a part of fan module 70 is movable to the outside of vehicular body 1.

Front grille 60 is configured to be pivotable about two pivot shafts 63, 66 and foldable. Thus, front grille 60 can be opened widely, and a space sufficient for a worker to work in the space between the front end of vehicular body 1 and blade 2 can be ensured. Front grille 60 can be folded and fan module 70 can be pivoted about pivot shaft 76 to thereby expose radiator 22 to a large extent. Front grille 60 folded in half is placed at the left side of vehicular body 1 and pivot shaft 76 is located at the left side of vehicular body 1, to thereby facilitate access to radiator 22 from the right side of vehicular body 1.

Since radiator 22 is exposed to the outside to enable direct access to radiator 22, radiator 22 can be cleaned easily. In the case where radiator 22 is damaged due to incoming foreign matter or the like, radiator 22 can easily be repaired or replaced.

Since front grille 60 is configured to be pivotable about pivot shafts 63, 66 extending in the top-bottom direction, first grille member 61 and second grille member 62 which are each a heavy part can easily be pivoted with human power. Since fan module 70 is configured to be pivotable about pivot shaft 76 extending in the top-bottom direction, fan module 70 which is a heavy part can easily be pivoted with human power. Additional equipment such as crane or hydraulic jack for moving front grille 60 and fan module 70 is unnecessary. Therefore, the cost and the man-hour for maintenance of fan module 70 and radiator 22 can be reduced.

Moreover, as shown in FIGS. 2 and 3, first grille member 61 is provided to extend from the left side to a central part of vehicular body 1, and second grille member 62 is provided to extend from the central part to the right side of vehicular body 1. Therefore, front grille 60 can be folded in half to widely open the opening at the front end of vehicular body 1.

Moreover, as shown in FIG. 5, first grille member 61 is configured to be pivotable about pivot shaft 66 to a position where first grille member 61 does not overlap radiator 22 as seen in front view. The range in which first grille member 61 is pivotable can be defined to widely open front grille 60 and ensure a sufficient work space, and thereby facilitate cleaning of radiator 22.

Moreover, second grille member 62 has front surface 62F and rear surface 62R, and also has distal end 62D located away from pivot shaft 63. Front surface 62F has inclined surface 65 at distal end 62D, and inclined surface 65 approaches rear surface 62R as the distance from pivot shaft 63 increases. Thus, when fan module 70 is pivoted about pivot shaft 76, fan module 70 can be prevented from interfering with second grille member 62 and therefore the maximum angle by which fan module 70 is pivotable can be increased. Accordingly, radiator 22 can be exposed to a large extent.

Moreover, as shown in FIG. 1, bulldozer 10 includes cab 9. As shown in FIG. 6, operator's seat 31 in cab 9 is disposed so that front edge FE of operator's seat 31 is inclined rightward with respect to the front-rear direction as seen in plan view. An operator can easily get on or off cab 9 configured in this way, from the right side of cab 9. Therefore, front grille 60 folded in half is placed at the left side of vehicular body 1 and pivot shaft 76 is placed at the left side of vehicular body 1, to thereby enable an operator to easily access radiator 22 from the right side of vehicular body 1.

Moreover, as shown in FIG. 2, bulldozer 10 further includes access device 11 forming a passage for an operator to get on and get off cab 9. Access device 11 is disposed at the right side for cab 9. From the right side of cab 9, an operator can easily get on or off cab 9 provided with such access device 11. Thus, front grille 60 folded in half is placed at the left side of vehicular body 1 and pivot shaft 76 is placed at the left side of vehicular body 1, to thereby enable the operator to easily access radiator 22 from the right side of vehicular body 1.

Moreover, as shown in FIG. 3, fan module 70 has fan blade 71. Pivot shaft 76 overlaps fan blade 71 as seen in side view, in the state where rotational center C of fan blade 71 extends in the front-rear direction. Pivot shaft 76 of fan module 70 is disposed at a position further rearward in the front-rear direction of vehicular body 1. Thus, when fan module 70 is pivoted about pivot shaft 76, fan module 70 can be prevented from interfering with members around fan module 70. Moreover, the maximum angle by which fan module 70 is pivotable can be increased and radiator 22 can be exposed to a still greater extent.

The above embodiment has been described regarding the configuration where pivot shaft 66 of first grille member 61 is disposed at the left side of vehicular body 1, folded front grille 60 is placed at the left side of vehicular body 1, and pivot shaft 76 of fan module 70 is disposed at the left side of vehicular body 1. Pivot shafts 66, 76 may be disposed at the right side of vehicular body 1. In this case as well, the aforementioned effect that radiator 22 can be cleaned easily can be obtained similarly. As described above in connection with the above embodiment, pivot shafts 66, 76 are disposed at one of the right and left sides which is opposite to the side where an operator getting on or off cab 9 frequently passes, and accordingly, radiator 22 can be accessed easily.

Moreover, the above embodiment has been described regarding the configuration where rear surface 61R of first grille member 61 faces rear surface 62R of second grille member 62 in the state where front grille 60 is folded in half. The direction in which second grille member 62 is pivoted with respect to first grille member 61 may be opposite to the direction in the above embodiment. More specifically, referring to FIG. 5, front grille 60 may be configured to be folded in half by pivoting second grille member 62 about pivot shaft 63 in the counterclockwise direction with respect to first grille member 61 as seen in plan view. In this case, front surface 61F of first grille member 61 faces front surface 62F of second grille member 62, in the state where front grille 60 is folded in half.

Thus, in the state where front grille 60 is closed, front surfaces 61F, 62F are exposed to the outside. In the state where front grille 60 is folded, rear surfaces 61R, 62R are exposed to the outside. Accordingly, both surfaces of front grille 60 can be subjected to maintenance as required. Rear surfaces 61R, 62R of front grille 60 may have respective inclined surfaces formed similarly to above-described inclined surfaces 64, 65, and accordingly the maximum angle by which fan module 70 is pivotable can be increased.

Moreover, the above embodiment has been described regarding opened front grille 60 configured to be foldable in half. However, front grille 60 may be configured to be folded into three or more parts.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

1 vehicular body; 2 blade; 3 crawler type carrier; 8 engine compartment; 9 cab; 10 bulldozer; 11 access device; 21 engine; 22 radiator; 31 operator's seat; 60 front grille; 61 first grille member; 61D, 62D distal end; 61F, 62F front surface; 61P, 62P proximal end; 61R, 62R rear surface; 62 second grille member; 63, 66, 76 pivot shaft; 64, 65 inclined surface; 67, 77 coupling portion; 70 fan module; 71 fan blade; 72 drive device; 73 fan shroud; 74 hydraulic pipe; C rotational center; FE front edge; ML median line; W width.

The invention claimed is:

1. A bulldozer comprising:
a vehicular body;
a front grille disposed at a front end of the vehicular body, the front grille including a first grille member extending from one side toward the other side of the vehicular body in a right-left direction of the vehicular body, a second grille member extending from the first grille member further toward the other side, a first pivot shaft provided at the one side, extending in a top-bottom direction of the vehicular body, and pivotably supporting the first grille member, and a second pivot shaft extending in parallel with the first pivot shaft and coupling the second grille member to the first grille member so that the second grille member is pivotable with respect to the first grille member;
a blade disposed frontward of and spaced from the front grille;
a radiator disposed in an engine compartment of the vehicular body; and
a fan module disposed in the engine compartment, a distance between the fan module and the front end being smaller than a distance between the radiator and the front end, the fan module being pivotable about a third pivot shaft provided at the one side and extending in parallel with the first pivot shaft, at least a part of the fan module being movable to an outside of the vehicular body.

2. The bulldozer according to claim 1, wherein the first grille member is provided to extend from the one side to a central part of the vehicular body in the right-left direction, and the second grille member is provided to extend from the central part to the other side.

3. The bulldozer according to claim 1, wherein the first grille member is configured to be pivotable about the first pivot shaft to a position where the first grille member does not overlap the radiator as seen in front view.

4. The bulldozer according to claim 1, wherein
the second grille member includes a front surface facing frontward and a rear surface facing rearward in a state where the second grille member is disposed to extend in the right-left direction of the vehicular body,
the second grille member includes a distal end located away from the second pivot shaft, and
the front surface has an inclined surface at the distal end, and the inclined surface approaches the rear surface as a distance from the second pivot shaft increases.

5. The bulldozer according to claim 1, further comprising:
a cab; and
an operator's seat disposed in the cab so that a front edge of the operator's seat is inclined rightward with respect to a front-rear direction of the vehicular body as seen in plan view.

6. The bulldozer according to claim 1, further comprising:
a cab; and
an access device disposed at the other side for the cab and forming a passage for an operator to get on and get off the cab.

7. The bulldozer according to claim 1, wherein
the fan module includes a fan blade, and
the third pivot shaft overlaps the fan blade as seen in side view, in a state where a rotational center of the fan blade extends in a front-rear direction of the vehicular body.

* * * * *